United States Patent [19]

Kersten et al.

[11] Patent Number: 4,463,157

[45] Date of Patent: Jul. 31, 1984

[54] SELF CURING CATIONIC AMIDE-GROUP-CONTAINING AMINOUREA RESIN, IF NECESSARY WITH URETHANE GROUPINGS

[75] Inventors: Hilde Kersten, Erlenbach; Helmut Mägerlein, Obernburg, both of Fed. Rep. of Germany

[73] Assignee: Akzo NV, Arnhem, Netherlands

[21] Appl. No.: 459,623

[22] Filed: Jan. 20, 1983

[30] Foreign Application Priority Data

Jan. 20, 1982 [DE] Fed. Rep. of Germany ....... 3201565

[51] Int. Cl.$^3$ .............................................. C08G 18/38
[52] U.S. Cl. .................................... 528/68; 528/74.5; 528/75
[58] Field of Search ........................... 528/68, 74.5, 75

[56] References Cited

U.S. PATENT DOCUMENTS 2,450,940 10/1948 Cowan et al. ...................... 106/186
4,296,010 10/1981 Tominaga .............................. 528/45

FOREIGN PATENT DOCUMENTS 3004538 10/1980 Fed. Rep. of Germany .

*Primary Examiner*—Maurice J. Welsh
*Attorney, Agent, or Firm*—Michael J. Striker

[57] ABSTRACT

Self-curing cationic amide-group-containing aminourea resins are disclosed, if necessary with urethane groupings, which are the reaction product of at least (A) a polyaminoamide which has been produced from (1) one or more predominantly higher fatty acids and one or more alkylene or polyalkylene-polyamines and/or (2) dimer fatty acids, if necessary in mixture with predominantly higher, substantially unsaturated fatty acids, and one or more alkylene- or polyalkylene-polyamines, and additionally partially contains cyclic amidine-groupings produced under splitting off of water and, if necessary, amino-groups blocked by ketimine, (B) a diisocyanate and, if necessary, of (C)

(1) a primary and/or secondary allyl- or methallylamine and/or (2) one or more saturated primary and/or secondary aliphatic, cycloaliphatic, heterocyclic or aromatic amines and/or (3) an allyl- or methallyl-alcohol and/or (4) one or more cyclic or polycyclic alcohols, which are olefinically unsaturated in their cyclic or polyclicic ring systems, and/or (5) a monoalcohol with a tert. N-atom and/or diol with, if necessary, a tertiary N-atom, and have been made dispersible in water with an acid under formation of cationic groups. Also disclosed is a method for the cationic deposition of such resins onto substrates.

11 Claims, No Drawings

SELF CURING CATIONIC AMIDE-GROUP-CONTAINING AMINOUREA RESIN, IF NECESSARY WITH URETHANE GROUPINGS

BACKGROUND OF THE INVENTION

The present invention concerns self curing cationic amide-group-containing aminourea resins, if necessary with urethane groupings, and their use for cathodic electrical coating of electrically conducting objects.

The cathodic electrical coating has been performed in known manner for a long time in industrial scale, and follows in principle so that an electrically conducting object is immersed in an aqueous dispersion of a cationic polymeric material. The current led through the dispersion between the electrically conducting and as cathode functioning object, and the anode as counterelectrode, effects the deposition onto the cathode. The previously known in the art, electrically depositable at the cathode resins fulfill their purpose to an extent which is still not optimal, since the layer thicknesses obtainable with them are too small, the necessary hardening temperatures being still relatively high (greater than or equal to 170° C.) and the emission, upon baking, of the coating agent, as a result of the splitting off of polyisocyanate blocking agent, is fairly substantial. The resins described in DE-OS No. 3,005,538 represent an example thereof, which are produced from defined basic polyamino resin adducts with masked polyisocyanates.

SUMMARY OF THE INVENTION

The present invention is therefore based upon the object of making available specific resins and a new method for the crosslinking of cationic coating agents, with which greater layer thicknesses up to 40–50μ can be realized, and the baking of the coating agent can be performed without loss of physical characteristics at a temperature between 100° C. and 140° C., without having therewith split off volatile polyisocyanate blocking agent in unprofitable manner, which become lost with the exhaust air and load the environment.

This object is attained according to the invention by self curing cationic amide-group-containing aminourea resin, if necessary with urethane groupings, which are thereby characterized in that they represent the reaction products of at least (A) a polyaminoamide, which has been produced from
  (1) one or more predominantly higher fatty acids and one or more alkylene- or polyalkylene-polyamines and/or
  (2) dimer fatty acids, if necessary in mixture with predominantly higher, substantially unsaturated fatty acids, and one or more alkylene or polyalkylene polyamines, and additionally partially contains cyclic amidine groupings arising under the splitting off of water, and, if necessary, contains amino groups blocked by way of ketimine,
(B) a diisocyanate and, if necessary, of
(C)
  (1) a primary and/or secondary allyl- or methallylamine and/or
  (2) one or more saturated primary and/or secondary aliphatic, cycloaliphatic, heterocyclic or aromatic amines and/or
  (3) an allyl- or methallyl alcohol and/or
  (4) one or more cyclic or polycyclic alcohols, which are olefinically unsaturated in their cyclic or polycyclic ring systems, and/or
  (5) a monoalcohol with a tert. N-atom and/or diol with, if necessary, a tertiary, N-atom and which have been made water-dispersible with an acid under formation of cationic groups.

The polyamino amide component (A) (1) is derived relative to the acid component predominantly from higher fatty acids. These can represent saturated fatty acids, but also can contain one or more double bonds. Examples for the multiply unsaturated fatty acids occurring in natural oils, such as linseed oil, tall oil and castor oil, are 9,11-octadecadienic acid, 9,12-octadecadienic acid, linoleic acid, linolic, α-eleostearic acid and β-eleostearic acid. Examples of simple unsaturated fatty acids are e.g. oleic acid, its higher homologs and zoomaric acid. Obviously, also appropriate and similar synthetic fatty acids can serve as starting material. The substantially unsaturated fatty acids can be used as polyamino amide components individually or as a mixture. For economic reasons, it is however preferred to use the commercially obtainable mixtures of such acids, which also still contain saturated fatty acids.

Thus suitable as acid component for the polyamino amide (A) (1) are, in particular, ricinene fatty acids. These represent mixtures of dehydrated castor oil-fatty acids and are composed substantially of 9,11-octadecadienic acid and 9,12-octadienic acid (ricinenic acids) in addition to 5–7% oleic acid and 3–5% saturated fatty acids. Likewise suitable are also the linseed oil fatty acids, which represent mixtures of linolic acid (about 38%), linoleic acid (about 42%), oleic acid (about 10%), stearic acid (about 3%), and palmitic acid (about 7%), the percent composition of which naturally can fluctuate within limits. Also tall oil fatty acids, which contain as fatty acids particularly palmitic, stearic, oleic, linoleic and linolic acid, are usable.

As higher fatty acids there can be used or admixed essentially also saturated fatty acids, such as stearic and palmitic acid. It is frequently recommended to replace the long-chain fatty acids in part by short-chain fatty acids such as acetic acid, propionic acid or butyric acid. This leads in several cases to more stable suspensions and harder baked films.

The polyamino amide component (A) (1) can, with regard to the amine component, be derived from an ethylenediamine and/or a polyethylene-polyamine. As examples of such compounds, mention may be made of: ethylenediamine, diethylene-triamine, triethylene-tetramine, tetraethylene-pentamine, mixtures of polyethylene-polyamines of the formula

wherein n=1 and/or 2 and/or 3. They contain additional imidazoline rings, which are produced by intramolecular splitting off of water from the amineamide:

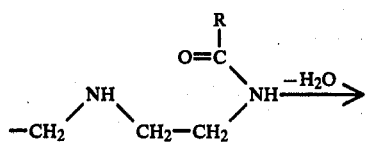

-continued

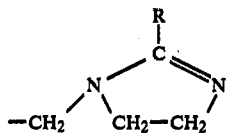

It is frequently recommended, to improve the dispersibility of the resin in water and for a stronger crosslinking with the baking operation, not to react a part of the primary amino groups with acids into amide, but to block with ketone as ketimine. Suitable ketones are, e.g., methylisobutylketone, methylethylketone, cyclohexanone. In the aqueous suspension, the ketone is split off and the primary amine is reformed.

Moreover, there can be used mixed polyalkylenepolyamine of the general formula

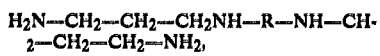

wherein R is ethylene (—CH$_2$—CH$_2$) or diethyleneamine (—CH$_2$—CH$_2$—NH—CH$_2$—CH$_2$—). They can easily be produced by addition of the corresponding amines (ethylenediamine or diethylenetriamine) to acrylonitrile and subsequent hydrogenation.

The polyamide produced from these polyamines with acids can, under drastic reaction conditions, likewise split off intramolecularly water, and thereby form tetrahydropyrimidine derivatives.

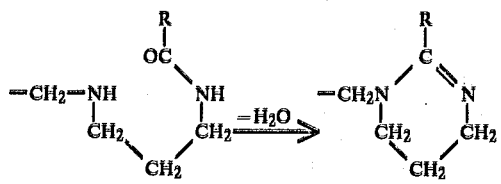

Also with these polyaminoamides it is frequently advantageous, when a part of the primary amino-groups is not reacted with acids, but is blocked with ketone as ketimine, which again split off in aqueous suspension.

It is preferred that the polyaminoamide (A) (1) is a reaction product of ricinene fatty acids or ricinene fatty acids and acetic acid or stearic acid with one or more alkylene- or polyalkylene-polyamines of the formula

wherein n=0 and/or 1 and/or 2 and/or 3, and/or

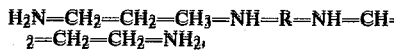

wherein R is —CH$_2$—CH$_2$—, and the reaction product additionally partially contains imidazoline- and/or tetrahydropyrimidine rings arising under splitting off of water and, if necessary, ketimine groups. The polyaminoamide component (A) (2) is derived with regard to the acid component from dimer fatty acids. These are produced from plant doubly or triply unsaturated fatty acids (linoleic, linolic and ricinoleic acid, wood oil-fatty acid) or their methyl esters through thermal dimerization, mainly in the presence of catalysts (Bentonite, Montmorillonite, Fuller's Earth). The addition reaction, proceeding essentially according to Diels-Alder, presupposes an isomerization into acids with conjugated double bond. In addition to the dimer fatty acids, therewith can be produced still 20-30% trimeric fatty acids. For construction of the polyaminoamide component (A) (2), the dimer fatty acids can be admixed up to 60% by weight into the above described higher, substantially unsaturated fatty acids, in particular tall oil fatty acids and ricinene fatty acids.

As amino component of the polyaminoamide (A) (2) there come into consideration particularly polyethyleneamine or its mixture of the type H$_2$N—(CH$_2$—CH$_2$—NH)$_n$—CH$_2$—CH$_2$—NH$_2$ with n=0 through 3. Upon the reaction of the polyethyleneamines with dimer fatty acids, if necessary in mixture with higher, substantially unsaturated fatty acids, additionally partially the formation of imidazoline-containing condensation products is desired, which follows through cyclization of the aminoamide component under splitting off of 1 Mol water. For this purpose the reaction product produced, for example, at 160° C., from the dimeric fatty acids and the polyethyleneamine, is heated e.g. 6 hours to 300° C. The products in question are commercially obtainable, e.g., under the trade designation Versamid (Schering). A further suitable amine component for the polyaminoamide (A) (2), also in the form of a mixture with the above polyethyleneamines, is e.g. the polyalkylene-polyamine of the formula

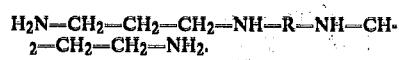

Herein R signifies —CH$_2$—CH$_2$— or —CH$_2$—CH$_2$—NH—CH$_2$—CH$_2$—. Upon the reaction of this polyalkylene-polyamine with dimer fatty acids, if necessary in mixture with ricinene fatty acids or other higher, substantially unsaturated fatty acids, the partial formation of tetrahydropyrimidine rings is striven for through intramolecular splitting off of water.

It is preferred that the polyaminoamide (A) (2) be a reaction product of dimer fatty acids and, if necessary, tall oil fatty acids or ricinene fatty acids, with one or more polyalkylene-polyamines of the formula

wherein n is from 0 to 3 and the reaction product partially contains imidazoline rings arising under the splitting off of water and, if necessary, ketimine groups.

The polyaminoamide (A) (2) contains in the perponderance of cases, likewise primary amino groups. It is also frequently advantageous herewith to block it with ketone as ketimine before the reaction with polyisocyanates. For this blocking there come into consideration those ketones as with the polyaminoamide components (A) (1).

For the formation of amide-group-containing aminourea resins, if necessary with urethane groupings, the polyaminoamides (A) (1) and/or (A) (2) among others are reacted with one or more diisocyanates according to conventional method techniques. The diisocyanates usable herewith include, for example, the aliphatic diisocyanates, such as e.g. 1,6-hexamethylenediisocyanate, 1,8-octamethylenediisocyanate, 1,12-dodecamethylenediisocyanate, 2,2,4-trimethylhexamethylenediisocyanate and similar alkylenediisocyanates, 3,3'-diisocyanatodipropylether, 3-isocyanatomethyl-3,5,5-trimethyl-cyclohexylisocyanate, cyclopentylen-1,3-diisocyanate, cyclohexylen-1,4-diisocyanate, 4-methyl-1,3-diisocyanatocyclohexane, trans-vinylidenediisocyanate and similar unsaturated diisocyanates, 4,4'-methylene-bis(isocyanatocyclohexane) and related isocyanates, aromatic diisocyanates, such as 4,4'-diisocyanatodiphenyl, 4,4'-diisocyanato-3,3'-dichloro-diphenyl, 4,4'-diisocyanato-,3,3'-dimethoxydiphenyl, 4,4'-diisocyanato-3,3'-dimethyl-diphenyl, 4,4'-diisocyanato-3,3'-diphenyl-diphenyl, 4,4'-diisocyanato-diphenylmethane, 4,4'-diisocyanato-3,3'-dimethyl-diphenylmethane, 1,5-diisocyanatonaphthalene, diisocyanato-toluene, N,N'-(4,4'-dimethyl-3,3'-diisocyanatodiphenyl)-uretdione and bis-1,3-(isocyanatomethyl)-benzene.

It is preferred that the component (B) be a mixture of 2,4- and 2,6-diisocyanatotoluene and/or 4,4'-diisocyanatodiphenylmethane.

For easier control of specific resin characteristics, for example to obtain a stronger crosslinking or a chain-lengthening of the macromolecule or a better dispersability or improved flow characteristics, if necessary the additional use of one or more of the compounds (C) can be advantageous.

Within the scope of the compounds (C) (1) there are suitable in principle all unsaturated amines, particularly the primary or secondary allyl- or methallylamines, e.g. allylamine, methallylamine, diallylamine, and dimethallylamine.

Further suitable compounds for the components (C) (2) represent saturated primary and/or secondary aliphatic and cycloaliphatic as well as aromatic and heterocyclic amines. These compounds, effective particularly as chain terminators, contribute to the avoidance of a too strong crosslinking of the resin and to an increase in the hardness of the baked films. They generally improve the emulsification behavior in water. Usable are e.g. ethylamine, propylamine, di-n-propylamine, di-i-propylamine, di-sec-butylamine, n-butylamine, sec.-butylamine, n-hexylamine, n-octylamine, 2-ethyl-hexylamine, n-decylamine, i-amylamine, di-i-amylamine, di-i-butylamine, α-naphthylamine, pyrrolidine, diethylamine, cyclohexylamine, piperidine, aniline, methylaniline, among others.

Not only the individual compounds as such, but also mixtures of two or more of the above amines mentioned by way of example can be used. This goes also for mixtures with the other classes of compounds mentioned for the component (C).

As component (C) are suitable likewise unsaturated alcohols, particularly allyl alcohol and methallyl alcohol. They act not only as chain terminator, but participate across the reactive double bond to the later curing of the resin.

In the same manner, work the cyclic or polycyclic alcohols, which are olefinically unsaturated in their cyclic or polycyclic ring system. Examples of particularly well suited compounds are represented in the following list:

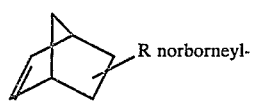

(1) R norborneyl-

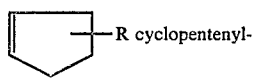

(2) R cyclopentenyl-

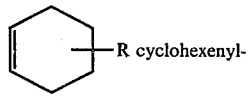

(3) R cyclohexenyl-

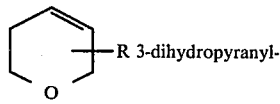

(4) R 3-dihydropyranyl-

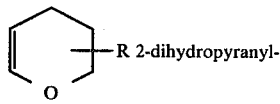

(5) R 2-dihydropyranyl-

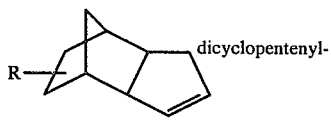

(6) dicyclopentenyl-

Herein R signifies in particular the groupings —OH, —CH$_2$OH, —CH$_2$—CH$_2$OH, —O—CH$_2$—CH$_2$—OH, —CH$_2$—O—CH$_2$—CH$_2$—OH,

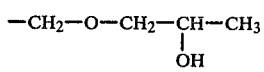

and —CO—NH—CH$_2$—CH$_2$—OH.

Within the scope of component (C) (5) are suitable as chain terminators also saturated monoalcohols, which contain a teritary N-atom, such as e.g. dimethylethanolamine. Further compounds of this type are for example diethylethanolamine, dipropylethanolamine, dibutylethanolamine, 4-(2-hydroxyethyl)-morpholine and ethyloxethylaniline.

For the construction of the polyurea-urethane resins it is sometimes advantageous to employ for the component (C) as chain-lengthening agent diols, with if necessary a teritary N-atom. Examples of such diols are polyglycols, such as polyethyleneglycol and polypropyleneglycol and their mixed polymerizates with a molecular weight up to 1000, glycerine monoethers of the general formula

R—O—CH$_2$—CHOH—CH$_2$OH, in which R is dicyclopentenyl-, ethoxydicyclopentenyl-, norborneyl-, dihydropyranyl-, cyclopentenyl-, cyclohexenyl-; methyldiethanolamine, n-butyldiethanolamine and cyclohexyldiethanolamine.

The ratio amounts of the starting components (A), (B) and (C) are so selected that in the resin the content of polyaminoamide component (A) amounts to between 30-80% by weight, the content of the diisocyanate component (B) amounts to between 10-45% by weight, and with use of component (C), its content amounts to up to 40% by weight.

The amino groups of the resin produced on the basis of the different possibilities for variation of the starting components (A) through (C) are with an acid at least partially, e.g. to 10, 30, 50, 70 or 80%, reacted into amine salt groups, and the resin is thereby made water-dispersible. In this connection, it is preferred, that the basic N-content of the resin amount of 0.5-2.5 equivalents/1000 g resin and the degree of neutralization of the basic resin reacted with acid amounts to 0.1-1 equivalents/1000 g resin. The formation of amine salt groups is effected in known manner by means of an inorganic, organic, complex-forming or non-complex-forming acid. Examples of suitable acids, which can also be used as a mixture, include carboxylic acids, such as formic acid, acetic acid and propionic acid, glycolic acid, lactic acid and tartaric acid, as well as inorganic acids such as sulfuric and phosphoric acid. The acid is provided diluted with water for better working in. In general one uses so much water that thereafter a suspension is obtained with 50–80% content of solids.

Aside from water, the aqueous medium can yet contain another solvent, for better solubility. Such solvents are e.g. esters, such as the monomethyl-, monoethyl-, monobutyl- and monohexyl ethers of ethyleneglycol acetate, ketones, such as diethylketone and methylisobutylketone, or diethers of glycol or diglycols, such as diglycoldiethylether and diglycol-di-n-butylether, moreover tetrahydrofurane and dioxane. The amount lies generally between 2 and 20% by weight, relative to the total weight of the aqueous medium.

The product with a solids content from 50 to 80% by weight can be homogeneously mixed by means of customary mixing techniques, under further dilution with water as 10 up to 25% by weight dispersion with sulfur and/or siccatives on the basis of naphthenates, oleates or acetates of heavy metal compounds, such as those of cobalt, manganese, lead or zinc, and/or pigments on the basis of heavy metal compounds, such as $TiO_2$, $PbCrO_4$, $PbSiO_3$, lead acetate and $SrCrO_4$, and/or fillers, such as $SiO_2$, talc and carbon black, whereby the hardness and the corrosion stability of the baked film is still further increased. In other respects it is likewise possible, to simultaneously grind up the sulfur and/or the siccative and/or the pigment under use of a cooled roller frame with the 50 to 60% by weight resin dispersion. The obtained mixture is then dispersed in water, and with further water diluted to the concentration of 10–25% by weight, customary in practice.

The aqueous coating mass, which preferably contains in amounts from 1 to 20% by weight, relative to the resin, sulfur and/or siccative on the basis of naphthenates, oleates or acetates of heavy metal compounds and/or pigments on the basis of heavy metal compounds and/or fillers, can moreover contain the customary adjuvants and additives, such as surface-active substances, anti-settling agents, antioxidants and dyes. The dispersions distinguish by good stability, high breakdown voltage and good throwing power values. The usable coating agent is brought into contact with the anode and the electrically conducting substrate to be coated, which functions as cathode. The voltage employed for its deposition onto the cathode amounts as a rule to between 200 and 350 volts, the initial current density by the current limits 0.1 up to 1 A/100 $cm^2$. The mentioned conditions are thus in general similar to those which in customary manner are used for the deposition of other cationic resins.

After applying the coating mass, the substrate composed of steel, aluminum or a metal alloy, in customary manner is washed, dried and subsequently, for hardening, heated to a temperature of 100° C., preferably from 120° up to 140° C. The self-curing amide-group-containing aminourea resin according to the present invention, if necessary with urethane groupings, allows for the obtaining of layer thicknesses up to 40 to 50 microns, and that upon use of lower temperatures than is the case with the previously customary isocyanate polymerization. They are not only energy-saving, but also environmentally compatible, since in the resin systems according to the present invention no volatile polyisocyanate blocking agents are used.

As a result of the lowered baking temperature it is possible to coat metal parts, which display plastic structures or are plastic-coated on one side, with these cationic resins, and to bake them collectively.

The obtained high layer thicknesses make possible a two-layer enamelling of vehicle bodies.

The salt spray test values are generally good. Phosphatized steel plates, which are provided only with the unpigmented films, display after 300 hours, still no undercutting at the scribe.

The novel features which are considered characteristic for the invention are set forth in particular in the appended claims. The invention itself, however, both as to its structure and method of preparation, will be best understood from the following description of preferred embodiments.

I

Production of the Aminoalkylenericineneamide (Table 1)

The polyalkyleneamine is dissolved in about the same amount of methanol, and under stirring, reacted with an about 70% solution of organic acids in methanol. The mixture is then heated initially under distilling off of the solvent, and subsequently of the reaction water, to 170°–180° C. Herewith occurs, in addition to the amide-formation, with advancing time, the imidazolidine or tetrahydropyrimidine formation. The provision of the total basic amine follows by titration with n/10 $HClO_4$ in glacial acetic acid, that of the basic cyclic amidine-nitrogen after acetylation of the primary and secondary amines, likewise through titration with n/10 $HClO_4$ in glacial acetic acid.

In case of the production of ketimine, one reacts the reaction mixture, after the amide formation and the partial ring closure, with ketone and toluene and splitting off of the reaction water with the aid of a water separator. Excess ketone and toluene are subsequently discharged under vacuum.

II

General Directions for the Production of the Amide-Group Containing Polyurea

1. Amide-group-containing polyureas (Tables 2–5)

One dissolves the polyaminoamide (A) and the amine in the same amounts by weight MEK (methylethylketone) and adds at 20°–30° C. a 50% solution or suspension of diisocyanate in MEK, under stirring and $N_2$-atmosphere, within about 15 minutes. One alloys another 15 minutes at room temperature for after-reacting, and provides subsequently the four-fold amount, relative to solids, of deionized water, mixed with 0.3 mMol acetic acid per g solids, at room temperature, and allows stirring in an open vessel for 3–4 days. Thereafter the resin is cationically deposited on phosphatized iron plates (Bonder 101), followed by baking at a maximal 140° C., and subsequently the pendulum hardness and the film thickness are measured.

Possibly additives, such as elementary sulfur or siccatives, are finely distributed into the aqueous suspension before the deposition, or with use of pigments, worked into the pigment paste.

2. Amide-group-containing polyurea with urethane-groupings
   (a) with use of monoalcohol, which carries olefinic groupings (Table 6):

Initially the urethane-group-containing isocyanate is prepared by reaction of the diisocyanate with the unsaturated alcohol in the same parts by weight of methylethylketone at 50° C., and the reaction period of 1 hour, and this 50% solution is subsequently added dropwise, within 15 minutes, under stirring and $N_2$-atmosphere, at 20°–30° C., into the 50% solution of the mixed polyaminoamide (A) in MEK. After an after-reaction period of about 15 minutes, one adds at room temperature the calculated amount of acetic acid (50% neutralization of the basic nitrogen) and so much entionized water, that after discharging of the solvent in a vacuum, a 20% suspension results. After 3–4 days' stirring in an open vessel at room temperature, the resin is cationically deposited onto phosphatized iron plates (Bonder 101). The pendulum hardness and film thickness of the films baked at less than or equal to 140° C. are measured. The additives are introduced finely distributed into the suspension.

(b) with use of diols and monoalcohols, which contain tertiary amino groups (Table 7):

In a reaction vessel provided with stirrer, dropping funnel and thermometer, in $N_2$-atmosphere, the ricinene amide IIIa, as well as the chain-lengthening alcohol of Group (C) (5) mentioned in Table 7, are provided, dissolved in the 3–5-fold amount by weight of water-free acetone, tetrahydrofurane or dioxane. At room temperature, one adds the solution of diisocyanate in the 3–5-fold amount of the same solvent dropwise, within 30–90 minutes, and subsequently thereto the chain-terminator (C) (5). The after-reaction period amounts to 60 minutes. Thereupon the arising amino resin is partially neutralized to 50% with acetic acid, and diluted with so much water that after discharge of the organic solvent at 60° C./30 Torr in a rotation evaporator, a 20% polymer dispersion is produced. Thereafter, still further additives, such as for example siccative, are provided, and then follows the cathodic deposition under the given conditions.

III

Production of the Pigment Pastes

1. Pigment paste 1

$TiO_2$, $SiO_2$, lead silicate and soot (weight ratio 1:0.84:0.21:0.04) are mixed with the doubled amount of the, partially neutralized with acetic acid (0.3 mMol AcOH/g solids), 50% resin suspension of Example No. 13 of Table 4 (weight ratio MEK:water=1:0.73) and the mixture is repeatedly intimately ground up in a cooled roller frame.

This pigment paste is then admixed to the resin of Example No. 13 of Table 4 in such a ratio that the pigment paste (calculated without solvent) constitutes 28.4% of the lacquer solids. The ratio of resin to pigments amounts thereby to 1:0.166. After diluting with water to a solids content of 20%, the lacquer is deposited in customary manner.

2. Pigment paste 2

$TiO_2$, talc, carbon black and lead silicate (weight ratio 1:0.63:0.50:0.15) are intimately ground up in a sand mill with the, with acetic acid partially neutralized to 50%, 40% resin suspension of Example No. 2a of Table 6, in a weight ratio of resin to pigments such as 1:0.228.

After diluting to a 20% content of solids, the lacquer is deposited in customary manner.

IV

Abbreviations in Tables 1–7

1. For reaction products with polyamines

| | |
|---|---|
| I a | = Versamid 140 commercial product of Schering |
| I b | = Versamid 115 commercial product of Schering |
| I c | = Versamid 100 commercial product of Schering |
| I d | = Euredur 370 commercial product of Schering |
| I e | = Euredur 200 commercial product of Schering |
| I f | = MIBK-Ketimine from Versamid 140 |
| I g | = MIBK-Ketimine from Euredur 200 |

| | | total amine number | tert. amine number |
|---|---|---|---|
| II a | = 1 DETA · 2 Ric | 108 | 5 |
| II b | = 1 DETA · 2 Ric | 102 | 37 |
| II c | = 1 DETA · 2 Ric | 100 | 69 |
| II d | = 1 DETA · 1.6 Ric · 0.4 MIBK | 143 | high |
| II e | = 1 DETA · 1.6 Ric · 0.4 MIBK | 153 | low |
| III a | = 1 TETA · 2 Ric | 192 | 26 |
| III b | = 1 TETA · 2 Ric | 171 | 32 |
| III c | = 1 TETA · 2 Ric | 170 | 58 |
| III d | = 1 TETA · 2 Ric | 165 | 83 |
| III e | = 1 TETA · 2 stearic acid | 156 | 75 |
| III f | = 1 TETA · 1.4 Ric · 0.6 AcOH | 209 | 39 |
| III g | = 1 TETA · 1 Ric · 0.5 dimer fatty acid | 162 | 62 |
| IV | $N_4$ · 2 Ric. | 180 | 22 |

2. Further material abbreviations

| | |
|---|---|
| DETA | = diethylentriamine |
| TETA | = Triethylentetramine |
| $N_4$ | = N,N'—bis(3-aminopropyl)-ethylendiamine |
| AcOH | = acetic acid |
| (ac) | = acetate |
| Stearic-Me | = stearic acid methyl ester |
| Ric-Me | = ricinenic acid methyl ester |
| Ric | = ricinene fatty acid |
| MIBK | = methylisobutylketone |
| dimer fatty acid from shell | |
| Dimer-Me | = dimer fatty acid-dimethylester |
| TDI | = 2,4- or 2,6-diisocyanatotoluene (mixture) |
| MDI | = 4,4'-diisocyanato-diphenylmethane |

3. for derivatives of the cyclic unsaturated compounds

Va = 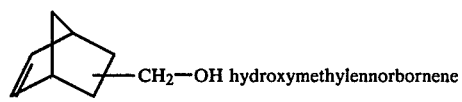 $CH_2$—OH hydroxymethylennorbornene

Vb = 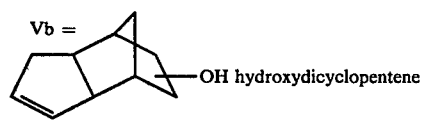 —OH hydroxydicyclopentene

Vc = 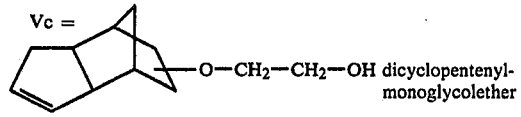 —O—$CH_2$—$CH_2$—OH dicyclopentenyl-monoglycolether

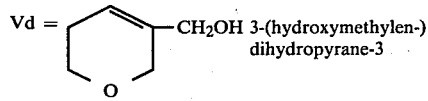

Vd = 3-(hydroxymethylen-)dihydropyrane-3

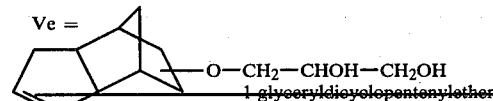

Ve = 1-glyceryldicyclopentenylether

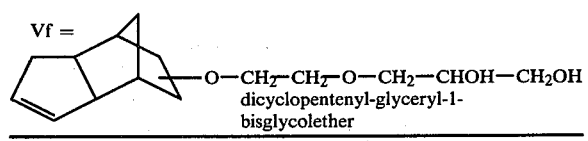

Vf = dicyclopentenyl-glyceryl-1-bisglycolether

TABLE 1
Production of the Polyaminoamide A (for Tables 2-7)

| Test No. | Product | Poly-amine | Weight (g) | Acid components | Weight (g) | Blocking Agent | Weight (g) | Mol Ratio of Reaction Components | 1st Stage (normal pressure) Reaction temp (°C.) | Time (h) | Total Amine # | tert.amine # |
|---|---|---|---|---|---|---|---|---|---|---|---|---|
| 1 | II a | DETA | 103 | Ric | 540 | | | 1:2 | 170-180 | 0.5 | | |
| 2 | II b | " | " | " | " | | | " | 180 | 1.2 | 113 | 4 |
| 3 | II c | " | " | " | " | | | " | 180 | 1 | | |
| 4 | II d | " | 103 | " | 432 | MIBK | 120 | 1:1.6 + 0.4 | 175 | 3 | | |
| 5 | II e | " | 361 | " | 1512 | MIBK | 120 | 1:0.6 + 0.4 | 175 | 1.5 | | |
| 6 | III a | TETA | 44 | Ric-Me | 170 | | | | 150 | 3 | | |
| 7 | III b | " | 73 | Ric | 270 | | | 1:2 | 180 | 2 | 171 | 32 |
| 8 | III c | " | " | " | " | | | " | 180 | 2 | | |
| 9 | III d | " | " | " | " | | | " | 180 | 3 | 170 | 44 |
| 10 | III e | " | 29 | Stearic-Me | 119 | | | " | 155 | 0.5 | | |
| 11 | III f | " | 146 | Ric + AcOH | 378 +36 | | | 1:1.4:0.6 | 180 | 1.75 | 209 | 39 |
| 12 | III g | " | 59 | Ric + Dimer-Me | 108 +114 | | | 1:1:0.5 | 170 | 0.5 | | |
| 13 | IV | N4 | 52 | Ric | 162 | | | 1:2 | 170 | 0.5 | | |

| Test No. | Product | 2nd Stage Reaction temp. (°C.) | Time (h) | Pressure (Torr) | Total amine # | tert. amine # | 3rd Stage Reaction temp. (°C.) | Time (h) | Pressure (Torr) | Total amine # | tert. amine # |
|---|---|---|---|---|---|---|---|---|---|---|---|
| 1 | II a | 180 | 1.5 | 760 | 108 | 5 | | | | | |
| 2 | II b | 170 | 4 | 26 | 102 | 37 | | | | | |
| 3 | II c | 180 | 6.25 | 30 | 100 | 69 | | | | | |
| 4 | II d | 165 | 3 | 760 | | | 120 | 3 | 30 | 143 | n.d. |
| 5 | II e | 170 | 1 | 760 | | | 120 | 0.75 | 30 | 153 | n.d. |
| 6 | III a | 150 | 2 | 50 | 192 | 25 | | | | | |
| 7 | III b | — | — | — | — | — | | | | | |
| 8 | III c | 150 | 3.25 | 30 | 170 | 58 | | | | | |
| 9 | III d | 155 | 4 | 26 | 165 | 83 | | | | | |
| 10 | III e | 160 | 3.5 | 30 | 156 | 75 | | | | | |
| 11 | III f | — | — | — | — | — | | | | | |
| 12 | III g | 170 | 4 | 25 | 162 | 62 | | | | | |
| 13 | IV | 170 | 4 | 30 | 180 | 22 | | | | | | n.d.: not determinable according to customary methods of analysis

TABLE 2
Amide-group-containing aminourea resins (Production from A + B)

| Run No. | Polyaminoamide A A (1) | % | A (2) | % | Diisocyanate B Type | % | Amine number | Breakdown Voltage (V) | Deposition Voltage (V) | Baking Temp. (°C.) | Layer Thickness (μ) | Pendulum hardness according to König (sec.) |
|---|---|---|---|---|---|---|---|---|---|---|---|---|
| 1 | II a | 55 | I a | 29 | TDI | 16 | 76 | 450 | 300 | 140 | 15 | n.d. |
| 2 | II a +III c | 28 34 | I a | 23 | " | 15 | 92 | 450 | " | " | 25 | 40 |
| 3 | II a +III c | 49 22 | I a | 15 | " | 14 | 61 | 400 | " | " | 20 | 35 |
| 4 | II a | 55 | I f | 28 | " | 17 | 58 | 475 | " | " | 20 | n.d. |
| 5 | II e | 53 | I f | 28 | " | 19 | 108 | 450 | " | " | 60 | n.d. |
| 6 | II a | 56 | I a +I f | 17 12 | " | 15 | 70 | 450 | " | " | 26 | n.d. |
| 7 | II a +III b | 12 37 | I g | 33 | " | 18 | 125 | 420 | " | " | 40 | n.d. | n.d. = not exactly determinable by pendulum hardness, since surface matt or structured. Films are hard.

TABLE 3

Amide-group-containing aminourea resin
Production from A (1) or A (2) and B and C (1)

| Run No. | Polyaminoamide A A (1) | % | A (2) | % | Diisocyanate B Type | % | Amine C (1) Type | % | Amine Number | Breakdown Voltage (V) | Deposition Voltage (V) | Baking temp. (°C.) | Layer Thickness (μ) | Pendulum hardness according to Konig (sec.) |
|---|---|---|---|---|---|---|---|---|---|---|---|---|---|---|
| 1 | III b | 61 | | | TDI | 25 | Diallylamine | 14 | 49 | 150 | 100 | 140 | 18 | 83 |
| 2 | III c | 61 | | | " | 25 | Diallylamine | 14 | 72 | 250 | 200 | " | 27 | 57 |
| 3 | III d | 61 | | | " | 25 | Diallylamine | 14 | 79 | 350 | 300 | " | 30 | 110 |
| 4 | | | I b | 51 | " | 28 | Diallylamine | 21 | 81 | 380 | " | " | 60 | n.d. |
| 5 | | | I c | 67 | " | 20 | Diallylamine | 13 | 36 | 375 | " | " | 24 | n.d. |
| 6 | | | III g | 69 | " | 21 | Diallylamine | 10 | 89 | 450 | " | " | 16 | 52 | n.d.: same as in Table 2

TABLE 4

Amide-group-containing aminourea resin production from A + B + C (1)

| Run No. | Polyaminoamide A A (1) | % | A (2) | % | Diisocyanate B Type | % | Amine C (1) Type | % | Additives Type | % | Amine number | Breakdown Voltage (V) | Deposition Voltage (V) | Baking temp. (°C.) | Layer thickness (μ) | Pendulum Hardness according to Konig (sec.) |
|---|---|---|---|---|---|---|---|---|---|---|---|---|---|---|---|---|
| 1 | IIa | 50 | Ia | 20 | TDI | 24 | allylamine | 6 | | | 57 | 350 | 300 | 140 | 19 | 134 |
| 2 | IIIb | 35 | " | 24 | " | 28 | diallylamine | 13 | | | 102 | 280 | 250 | " | 38 | 169 |
| 3 | " | 39 | " | 16 | " | 31 | diallylamine | 14 | | | 83 | 300 | 250 | " | 17 | 178 |
| 4 | " | 31 | " | 21 | MDI | 36 | diallylamine | 12 | | | 91 | 350 | 300 | " | 20 | 193 |
| 5 | IIIb IIIf | 24 11 | " | 24 | TDI | 28 | diallylamine | 13 | | | 100 | 350 | 250 " " | " 130 120 | 24 25 25 | 179 168 164 |
| 6 | IId | 50 | Ib | 15 | " | 24 | diallylamine | 11 | | | 73 | 415 | 350 | 140 | 45 | 105 |
| 7 | IIIb | 45 | " | 14 | MDI | 31 | diallyamine | 10 | | | 44 | 450 | 300 | " | 20 | 175 |
| 8 | IV | 50 | " | 15 | TDI | 24 | diallylamine | 11 | | | 69 | 390 | 300 | " | 25 | 155 |
| 9 | IIIc | 33 | Ic | 33 | MDI | 25 | diallylamine | 10 | | | 68 | 400 | 300 | " | 24 | 100 |
| 10 | IIIb | 35 | Id | 24 | TDI | 28 | diallylamine | 13 | | | 95 | 260 | 220 | " | 35 | 156 |
| 11 | " | 35 | Ie | 24 | " | 28 | diallylamine | 13 | | | 98 | 340 | 260 280 | " 120 | 32 36 | 174 154 |
| 12(a) (b) (c) | IIa | 48 | Ia | 19 | " | 23 | diallylamine | 10 | +S +S + Pbac₂.3H₂O +S + Pbac₂.3H₂O | 3* 3 + 3* " | 51 | 330 | 300 " " " | 140 " " 120 | 30 28 29 30 | 141 148 164 111 |
| 13(a) (b) (c) | IIIb | 50 | Ib | 15 | " | 24 | diallylamine | 11 | +pigment paste 1(100%) +pigment paste 1(100%) +Pbac₂.3H₂O | 28.7** 28.7** +3* | 73 | 280 350 300 | 230 300 250 | 140 " " | 42 36 32 | 134 136 129 |

Additive %
*relative to solids;
**content in total solids

TABLE 5

Amide-group-containing aminourea resin, Production from A and B and C (2)

| Run No. | Polyaminoamide A A (1) | % | A (2) | % | Diisocyanate B Type | % | Amine C (2) Type | % | Amine number | Breakdown Voltage (V) | Deposition Voltage (V) | Baking temp. (°C.) | Layer thickness (μ) | Pendulum hardness acc. to Konig (sec.) |
|---|---|---|---|---|---|---|---|---|---|---|---|---|---|---|
| 1 | III e | 53 | I b | 15 | TDI | 22 | di-n-propylamine | 10 | 71 | 410 | 350 | 140 | 53 | 123 |
| 2 | III b | 50 | I b | 15 | " | 24 | " | 11 | 70 | 380 | 350 | " | 28 | 134 |
| 3 | III b | 50 | " | 16 | " | 24 | tert. butylamine | 10 | 74 | 450 | 300 | " | 25 | 118 |
| 4 | " | 47 | " | 14 | " | 22 | di-n-butylamine | 17 | 76 | 325 | 250 | " | 32 | 134 |

TABLE 5-continued

Amide-group-containing aminourea resin, Production from A and B and C (2)

| Run No. | Polyaminoamide A A (1) | % | A (2) | % | Diisocyanate B Type | % | Amine C (2) Type | % | Amine number | Breakdown Voltage (V) | Deposition Voltage (V) | Baking temp. (°C.) | Layer thickness (μ) | Pendulum hardness acc. to König (sec.) |
|---|---|---|---|---|---|---|---|---|---|---|---|---|---|---|
| 5 | " | 47 | " | 14 | " | 22 | di-i-butylamine | 17 | 76 | 310 | 250 | " | 18 | 129 |
| 6 | " | 49 | " | 15 | " | 24 | piperidine | 12 | 66 | 430 | 300 | " | 24 | 150 |
| 7 | " | 49 | " | 15 | " | 23 | cyclohexylamine | 13 | 82 | 320 | 250 | " | 60 | 129* |
| 8 | " | 49 | " | 15 | " | 24 | morpholine | 12 | 76 | 350 | 200 | " | 20 | 104 |
| 9 | " | 50 | " | 15 | " | 23 | aniline | 12 | 85 | 300 | 250 | " | 20 | 116* |

*degree of neutralization = 0.6 mMol AcOH/g solids

TABLE 6

Polyamide-group-containing aminourea resin with urethane groupings
Production from A and B and C (3) or C (4)

| Run No. | Polyaminoamide A A (1) | % | A (2) | % | Diisocyanate B Type | % | Alcohol with olefinic or cycloolefinic Groups C Type | % | Additive Type | % | Amine number | Breakdown Voltage (V) | Deposition Voltage (V) | Baking temp. (°C.) | Layer thickn. (μ) | Pendulum Hardness acc. to König (sec.) |
|---|---|---|---|---|---|---|---|---|---|---|---|---|---|---|---|---|
| 1 | IIa | 44 | Ia | 17 | TDI | 29 | allyl alcohol | 10 | | | 31 | 285 | 200 | 140 | 26 | n.d. hard |
| 2a | " | 49 | " | 20 | " | 23 | methallyl alcohol | 8 | Pigment | 33** | 51 | 300 | 250 | " | 29 | 92 |
| b | | | | | | | methallyl alcohol | | paste 2 | | | | 200 | " | 18 | 120 |
| 3 | " | 46 | " | 19 | " | 22 | hydroxymethylene norbornene (Va) | 13 | | | 44 | 430 | 350 | " | 31 | 118 |
| 4 | " | 45 | " | 18 | " | 22 | hydroxydicyclopentene (Vb) | 15 | | | 36 | 500 | 200 | " | 50 | n.d. hard |
| 5a | " | 43 | " | 17 | " | 21 | dicyclopentenyl-monoglycolether (Vc) | 19 | | | 39 | 500 | 300 | " | 24 | 117 |
| b | | | | | | | dicyclopentenyl-monoglycolether (Vc) | | S | 3* | | | " | " | 23 | 116 |
| 6a | " | 48 | " | 19 | " | 22 | 3-(hydroxymethylene-) dihydropyrane-3 (Vd) | 12 | | | 43 | 440 | 300 | " | 25 | 127 |
| b | | | | | | | 3-(hydroxymethylene-) dihydropyrane-3 (Vd) | | S | 3* | | | " | " | 25 | 129 |

%: *relative to solids;
**content in total solids;
n.d.: same as Table 2

TABLE 7

Polyamide-group-containing aminourea resin with urethane groupings
Production from A + B + C (5)

| Run No. | Polyaminoamide A A (1) | % | Diisocyanate B Type | % | Saturated alcohol with, if necessary, tert. amino groups C Type | % | Additive Type | % | Amine number | Breakdown Voltage (V) | Deposition Voltage (V) | Baking temp. (°C.) | Layer thickn. (μ) | Pendulum hardness acc. to König (sec.) |
|---|---|---|---|---|---|---|---|---|---|---|---|---|---|---|
| 1 | IIIa | 32 | MDI | 41 | 1-glyceryl-dicyclopentenylether (Ve) polyethyleneglycol 300 dimethylethanol-amine | 11 / 10 / 6 | Co(ac)₂.4H₂O | 2* | 62 | 250 | 200 | 120 | 15 | 154 |
| 2 | " | 40 | " | 38 | dicyclopentenyl-glyceryl-1-bis glycolether (Vf) dimethylethanol | 16 / 6 | — | | 71 | 300 | 250 | 150 | 15 | 190 |

TABLE 7-continued

| | | | | | | | | | | | Pendulum |
| | | | | | | | Break- | Depo- | | | hardness |
| | Polyamino- | | Diiso-cyanate | Saturated alcohol with, if necessary, tert. amino groups C | | | Amine | down | sition | Baking | Layer | acc. to |
| Run | amide A | | B | | | Additive | num- | Voltage | Voltage | temp. | thickn. | Konig |
| No. | A (1) | % | Type % | Type | % | Type % | ber | (V) | (V) | (°C.) | (μ) | (sec.) |
| | | | | amine | | | | | | | | |

*relative to solids

It will be understood that each of the elements described above, or two or more together, may also find a useful application in other types of resins differing from the types described above.

While the invention has been illustrated and described as embodied in self-curing cationic amide-group-containing aminourea resins, if necessary with urethane groupings, it is not intended to be limited to the details shown, since various modifications and structural changes may be made without departing in any way from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Self-curing cationic amide-group-containing aminourea resin, optionally with urethane groupings, comprising the reaction product of at least
(A) a polyaminoamide which has been produced from
   (1) one or more predominantly higher fatty acids and one or more alkylene or polyalkylene-polyamines and/or
   (2) dimer fatty acids, optionally in mixture with predominantly higher, substantially unsaturated fatty acids, and one or more alkylene- or polyalkylene-polyamines, and said polyaminoamide additionally partially contains cyclic amidine-groupings produced under splitting off of water and, optionally, amino-groups blocked by ketimine, and
(B) a diisocyanate
and which have been made dispersible in water with an acid under formation of cationic groupings.

2. Cationic resin according to claim 1, wherein the component (A) (1) is a reaction product of ricinene fatty acids or ricinene fatty acids and acetic acid or stearic acid with one or more alkylene- or polyalkylene-polyamines of the formula $$H_2N-(CH_2-CH_2-NH)_n-CH_2-CH_2-NH_2$$

wherein n=0 and/or 1 and/or 2 and/or 3, or $$H_2N-CH_2-CH_2-CH_2-NH-R-NH-CH_2-CH_2-CH_2-NH_2$$

wherein R is $-CH_2-CH_2-$, and the reaction product additionally partially contains imidazoline- and/or tetrahydropyrimidine rings produced under splitting off of water and, optionally, ketimine groups.

3. Cationic resin according to claim 1, wherein component (A) (2) is a reaction product of dimer fatty acids and, optionally, tall oil fatty acids or ricinene fatty acids, with one or more polyalkylene-polyamines of the formula $$H_2N-(CH_2-CH_2-NH)_n-CH_2-CH_2-NH_2$$

wherein n=0 and 1-3 or 1 and/or 2 and/or 3, and the reaction product partially containing imidazoline rings arising under splitting off of water and, optionally, ketimine groups.

4. Cationic resin according to claim 1, wherein component (B) is a mixture of 2,4- and 2,6-diisocyanato-toluene and/or 4,4'-diisocyanato-diphenylmethane.

5. Cationic resin according to claim 1, wherein the cyclic or polycyclic alcohol is a norborneyl-, cyclohexenyl-, dihydropyranyl-, cyclopentenyl- or dicyclopentenyl-derivative.

6. Cationic resin according to claim 1, wherein in the resin the content of polyaminoamide component (A) amounts to between 30 and 80% by weight, the content of diisocyanate component (B) amounts to between 10 and 45% by weight.

7. Cationic resin according to claim 1, wherein the basic N-content of the resin amounts to 0.5 to 2.5 equivalents/1000 g resin and the degree of neutralization of the basic resin reacted with acid amounts to 0.1 to 1 equivalents/1000 g resin.

8. In a method for the coating of an electrically conducting substrate which serves as cathode, with a cationic resin dispersible in water, of the type in which an electrical current is led through the cationic resin dispersible in water, between anode and cathode, the improvement comprising using as resin a cationic resin according to claim 1.

9. Method according to claim 8, wherein said cationic resin dispersible in water further contains sulfur and/or siccative on the basis of naphthenates, oleates or acetates of heavy metal compounds and/or pigments on the basis of heavy metal compounds and/or fillers.

10. Cationic resin according to claim 1, wherein said reaction product is further a reaction product of (C)
   (1) a primary and/or secondary allyl- or methallylamine and/or
   (2) one or more saturated primary and/or secondary aliphatic, cycloaliphatic, heterocyclic or aromatic amines and/or
   (3) an allyl- or methallyl-alcohol and/or
   (4) one or more cyclic or polycyclic alcohols, which are olefinically unsaturated in their cyclic or polycyclic ring systems, and/or
   (5) a monoalcohol with a tert. N-atom and/or diol with, optionally, a tertiary N-atom.

11. Cationic resin according to claim 10, wherein the content of component (C) amounts to up to 40% by weight.

* * * * *